July 12, 1938. J. H. S. HAMER Re. 20,793

CONTROL SYSTEM

Original Filed Aug. 12, 1932

INVENTOR
James H. S. Hamer
BY
Ward, Crosby & Neal
ATTORNEYS

Reissued July 12, 1938

Re. 20,793

UNITED STATES PATENT OFFICE 20,793

CONTROL SYSTEM

James H. S. Hamer, Brooklyn, N. Y., assignor to Trans-Lux Corporation, a corporation of Delaware Original No. 2,023,420, dated December 10, 1935, Serial No. 628,532, August 12, 1932. Application for reissue December 19, 1936, Serial No. 116,843

12 Claims. (Cl. 88—24)

My invention relates to a system wherein the effect of a jet of air or other fluid on an electrical switch or equivalent, is controlled by a tape, web or the like.

In the disclosed form of my invention, an arrangement is shown for drawing a character-bearing tape through a projection field after ejection of said tape from a suitable printing device, such as the well-known stock ticker mechanism. It is well understood in the art that the aforesaid tape should move through the projection field regularly and evenly in contradistinction to the non-uniform, irregular and intermittent manner in which it is delivered from the stock ticker mechanism. In accordance with my invention, the mechanism for pulling the tape through the projection field is controlled by the tape itself in the general manner described above whereby there is obtained the desired regular and even movement of the tape through said projection field.

Various other advantages, characteristics and features of my invention will become apparent from the following detailed description taken in connection with the accompanying drawing.

My invention resides in the system, arrangement, features and combination of parts of the character hereinafter described and claimed.

For an understanding of my invention and for an illustration of one of the forms thereof, reference is to be had to the accompanying drawing, in which.

Figure 1:
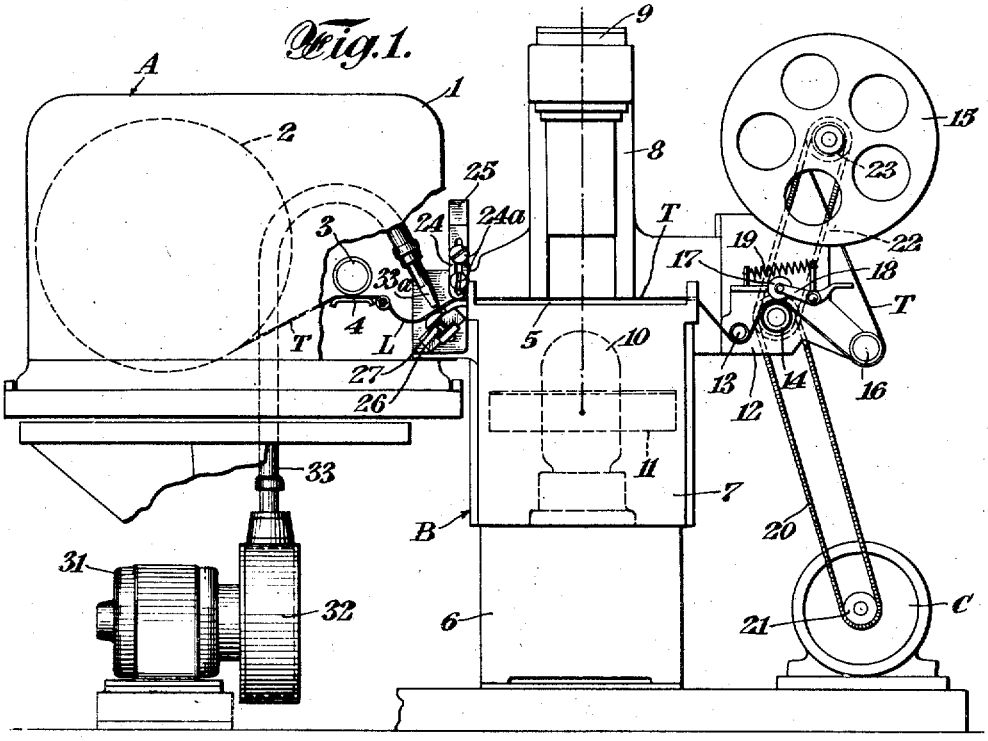
Figure 1 is an elevational view, partly broken away, of a tape-pulling system embodying the features of my invention.

Referring to Fig. 1, A represents any suitable device for printing characters on a tape or web. The device A may be and ordinarily is a stock ticker mechanism which, as herein generally shown, comprises a housing 1, a reel 2, a printing wheel 3, and a movable platen 4. The tape T, which is transparent or semi-transparent in the example shown, comes from the reel 2 and passes between the wheel 3 and the platen 4 where the printing operation occurs.

In a manner well understood in the art, the tape T is ejected from the ticker A in a non-uniform, irregular and intermittent manner, said tape T passing from left to right, Fig. 1, across the projection table 5 of a projector B which may be of any suitable character and which, in the example shown, is generally as disclosed in the copending Halloran application Serial No. 373,767, filed June 26, 1929, and which has become Patent No. 1,952,249, dated March 27, 1934. Accordingly, said projector B is shown as comprising a base 6 supporting a housing 7 from which rises a standard 8 carrying a suitable projection lens 9. The housing 7 contains a suitable source of light 10, a condensing arrangement, not shown, and a mirror 11 whereby the beam of light is caused to pass upwardly through that section of the tape T framed by the projection aperture 5a of the table 5, said beam of light thereafter traversing the projection lens 9 and then suitably passing to any suitable screen, not shown.

In the example shown, although not necessarily, the projector B comprises an extension 12 which carries the mechanism for pulling the tape across the aforesaid projection table 5. As herein shown, the tape T, after leaving the projection field, passes beneath an idler roll 13, thence over a driven roll 14 and then is wound upon a reel 15 after passing around an idler roll 16. The tape T is positively held in driving relation with respect to the roll 14 by a roll 17 carried by a pivoted arm 18 which is biased in a counterclockwise direction, Fig. 1, by a suitable spring 19.

The aforesaid driving roll 14 is mounted on a suitable shaft carrying a pulley operated by an endless belt 20 which extends over and is driven by a pulley 21 rotated by the armature shaft of a suitable electric motor C. The above noted shaft also carries a second pulley for operating an endless belt 22, preferably a flexible spring belt, which extends over and drives a pulley 23 carried by the same shaft which carries the reel 15.

Preferably, a retarding or braking action is exercised on the tape T as it enters the projection field 5. Any suitable arrangement may thus be utilized such, for example, as herein shown as comprising a slotted member 24 guided by screws 24a for free reciprocatory movement in a vertical direction on a fixed support 25, the member 24 being biased under the influence of gravity toward the projection table 5 and, when the tape T is disposed therebeneath, exercising the desired braking action thereon.

Usually, the arrangement is such that the roll 14 pulls tape across the projection table 5 substantially in correspondence with the average rate at which the tape is ejected by the ticker. In ordinary commercial practice, the ticker operates in an irregular, intermittent manner and, therefore, it becomes necessary to vary the operation of the roll 14 under control of the motor C in accordance with the rate at which tape is ejected by the ticker. This, in accordance with my invention, is accomplished in a highly advantageous and satisfactory manner.

Figure 2:
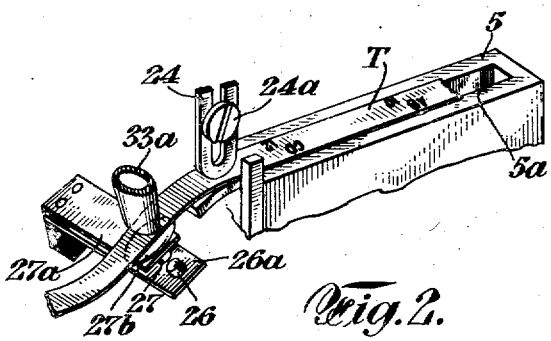
Fig. 2 is an enlarged perspective view illustrating parts of my novel arrangement.
Figure 3:
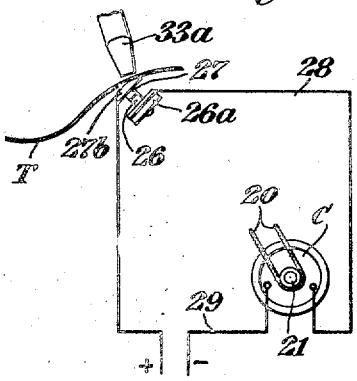
Fig. 3 is a diagram illustrating the control circuit of the tape-pulling motor.

As illustrative of one arrangement which has proven satisfactory in operation, there is shown on the drawing a pair of switch contact elements 26 and 27 disposed adjacent the entrance to the projection field and somewhat below the level thereof. The contact element 26 is carried by an electricity-conducting arm 26a which is supported in the position shown on the drawing in any suitable manner. The contact element 27 is carried by an electricity-conducting arm 27a suitably secured, in insulated relation, to the arm 26a, the latter also being suitably insulated from its support. The arm 27a is formed of suitable resilient material and is freely movable as hereinafter described. The arm 26a, however, is relatively rigid and stationary. Normally, the position of the spring arm 27a is as illustrated in Fig. 2, the contact elements 26 and 27 being in non-contacting relation when said arm 27a is thus positioned.

Connected to the contact element 26 is a conductor 28 which leads to one terminal of the aforesaid motor C, the other terminal of which has connected thereto a conductor 29 which includes a suitable source of current, not shown, and which is connected to the contact element 27.

In accordance with my invention, an arrangement is provided, the normal tendency of which is to maintain the contact element 27 closed upon the contact element 26 but which becomes ineffective to accomplish this result soon after operation of the ticker A is discontinued. To this end, there may be utilized an arrangement such as illustrated wherein a motor 31 is shown as operating an air pump 32 to continuously move a stream of air through a conduit 33. The nozzle 33a of said conduit 33 is so arranged as to direct the stream of air toward the movable contact element 27 and particularly a button 27b carried on the upper surface thereof whereby, unless the action of said stream of air is impeded, the switch element 27 remains closed on the switch element 26.

As clearly appears from the drawing, the tape T issues from the ticker A flatwise and so remains as it passes across the projection table 5 which is alined with the path taken by the tape as it leaves the ticker. The switch element 27 together with its button 27b is disposed directly beneath the tape T. The conduit nozzle 33a is so directed that the path of the tape T is between the end thereof and the switch contact element 27, 27b.

The operation is as follows:

The arrangement is such that the roll 14, when operating at normal speed, pulls the tape across the projection table 5 at approximately the speed at which tape is ejected from the ticker A during normal, non-interrupted operation thereof. As the parts are related in Fig. 1, it is assumed that the ticker A is operating as last stated and that the roll 14 is pulling the tape across the projection table 5 at its normal rate of speed.

It will be noted that a downwardly extending loop L exists in the tape between the ticker A and the projection table 5. Accordingly, the stream of air issuing from the nozzle 33a strikes the tape and, due to the fact that the tape loop L is of substantial depth, the tape is held against the button 27b. Since the tape thus offers little or no obstruction to the stream of air, it results that the contact element 27 is held in engagement with the contact element 26 and, accordingly, the circuit of the motor C remains closed with resultant operation of the roll 14.

In the event that operation of the ticker A ceases, the loop L shortens or decreases in depth and, as a result, the tape in the loop formation becomes more or less taut. As the tape loop shortens, the tape tends to and does move upwardly from the button 27b and, in so doing, takes on a function as a shield to prevent application of force to said button 27b by the stream of air flowing from the nozzle 33a. When this happens, the contact element 27 moves from the contact element 26 under the influence of spring arm 27a whereupon the motor C is deenergized and operation of the roll 14 is discontinued.

The parts remain in the relation last stated until operation of the ticker A is again initiated. At this time, the first action results in increase in depth of the loop L whereupon the jet of air again becomes effective to move the switch element 27 into engagement with the adjacent switch element 26. When this occurs, the circuit through the motor C is again completed and the latter, by operation of the roll 14, again operates to pull tape across the projection table 5, this continuing until operation of the ticker A is again discontinued whereupon the sequence of steps described above again occurs.

The member 24 operates, as stated, to apply a braking action to the tape T. As a result, transmission of impulses generated by the ticker A to the tape section on the projection table 5 is substantially prevented and, accordingly, the projected images move across the screen smoothly and without jump.

Operation of the roll 14 as above described is effected by transmission of power to the shaft carrying the same by the belt 20. Operation of said last named shaft effects operation of the belt 22 which serves to rotate the reel 15 and wind the tape thereon.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a switch, means for directing an operating jet of air toward said switch, and a tape movable in loop formation between said switch and said means, the length of the tape loop controlling operation of said switch by said jet of air.

2. In combination, means for pulling a tape along a path, and means for controlling operation of said pulling means, said controlling means comprising a switch and a conduit for directing an operating jet of air toward said switch, said tape, at times, rendering said jet of air ineffective to control said switch.

3. In combination, means for pulling a tape along a path, and means for controlling operation of said pulling means, said controlling means comprising a switch and a conduit for directing a jet of air toward said switch, said tape controlling operation of said switch by said jet of air.

4. In combination, means for pulling a tape along a path, and means for controlling operation of said pulling means, said controlling means comprising a switch and a conduit for directing a jet of air toward said switch, said tape moving along a path between said conduit and switch and controlling operation of said switch by said jet of air.

5. In combination, a printing device from which a printed tape is ejected, means for pulling said tape through a projection field, and means for controlling operation of said pulling means, said controlling means comprising a switch and a conduit for directing an operating jet of air toward said switch, said tape, at times, rendering said jet of air ineffective to control said switch.

6. In combination, a printing device from which a printed tape is ejected, means for pulling said tape through a projection field, and means for controlling operation of said pulling means, said controlling means comprising a switch and a conduit for directing an operating jet of air toward said switch, said tape, moving along a path between said switch and conduit and, at times, rendering said jet of air ineffective to control said switch.

7. In combination, a printing device from which a printed tape is ejected, means for pulling said tape through a projection field, and means for controlling operation of said pulling means, said controlling means comprising a switch and a conduit for directing an operating jet of air toward said switch, a loop in said tape between said printing device and said projection field changing in depth and, at times, rendering said jet of air ineffective to control said switch.

8. In combination, a printing device from which a printed tape is ejected intermittently and at an irregular rate, means for pulling said tape through a projection field, a switch comprising a movable element for controlling operation of said pulling means, and a conduit for directing a jet of air toward said switch element, said tape, when said printing device and said pulling means operate non-synchronously with respect to each other, preventing control of said switch element by said jet of air.

9. In combination, a printing device from which a printed tape is ejected intermittently and at an irregular rate, means for pulling said tape through a projection field, a switch comprising a movable element for controlling operation of said pulling means, and a conduit for directing a jet of air toward said switch element, said tape, when said printing device and said pulling means operate non-synchronously with respect to each other, preventing control of said switch element by said jet of air, said tape, when said printing device and said pulling means operate synchronously with respect to each other, returning the control of said switch element to said jet of air.

10. In combination, a printing device from which a printed tape is ejected, said tape forming a loop between said printing device and a projection field, a switch comprising a movable switch element disposed at one side of the tape loop, and a conduit at the other side of said tape loop for directing a jet of air toward said switch element.

11. In combination, a printing device from which a printed tape is ejected, said tape forming a loop between said printing device and a projection field, a switch comprising a movable switch element disposed adjacent one side of the tape loop, and on the opposite side of said tape loop a conduit from which a jet of air issues, said jet of air tending to retain the tape in contact with said movable switch element.

12. In combination, a printing device from which a printed tape is ejected, a conduit for directing a jet of air on the tape section between said printing device and a projection field whereby said tape section is maintained in loop formation, means for pulling said tape through said projection field, and means on the opposite side of the tape and disposed in the direct path of said jet of air for controlling said tape pulling means.

JAMES H. S. HAMER.